A. C. BAILEY.
BICYCLE RIM.
APPLICATION FILED MAR. 8, 1919.

1,311,434.

Patented July 29, 1919.

INVENTOR
ARTHUR C. BAILEY
BY
E. B. [illegible]
ATTORNEY

UNITED STATES PATENT OFFICE.

ARTHUR C. BAILEY, OF VANCOUVER, WASHINGTON.

BICYCLE-RIM.

1,311,434.     Specification of Letters Patent.     Patented July 29, 1919.

Application filed March 8, 1919. Serial No. 281,518.

*To all whom it may concern:*

Be it known that I, ARTHUR C. BAILEY, a resident of the city of Vancouver, in the county of Clark and State of Washington, have invented a new and useful Bicycle-Rim, of which the following is a specification.

My invention relates more particularly to a rim such as is used on bicycles, and to a means for securing same to the tires.

The object of my invention is to provide an exceedingly simple and efficient means for attaching and locking a rubber tire to a rim, and at the same time provide an exceedingly strong rim incapable of being affected by heat or moisture.

I attain these results in the manner illustrated in the accompanying drawing and described in the specification following.

Figure 1:
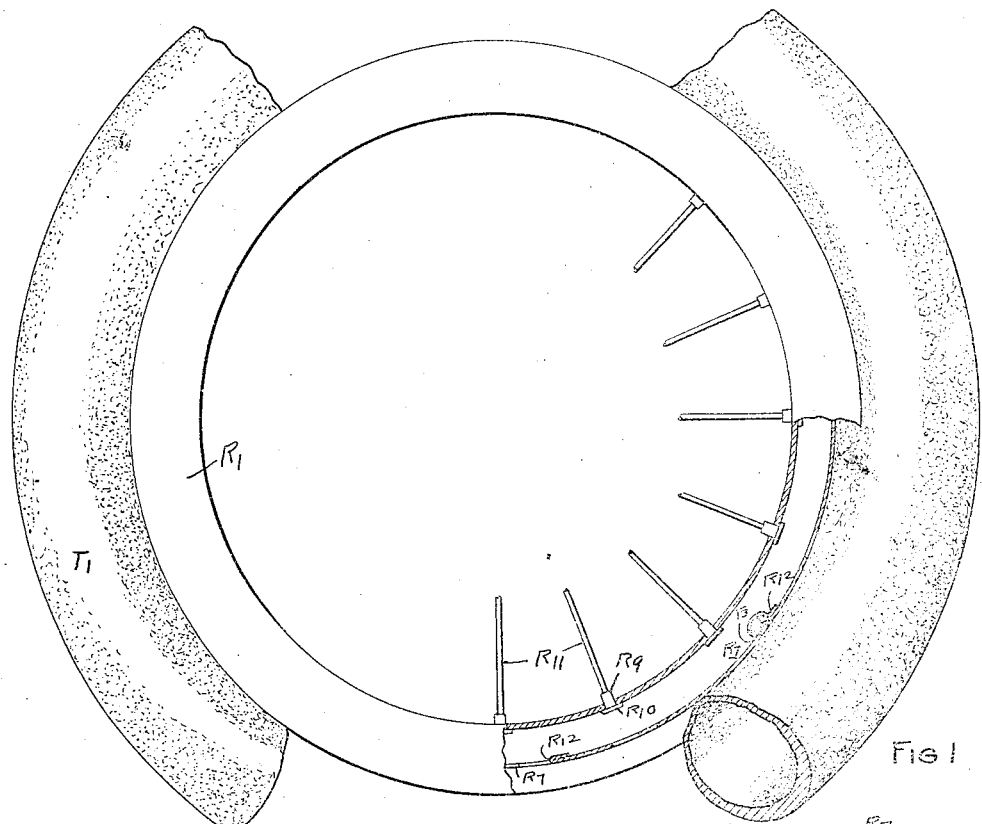
Figure 2:
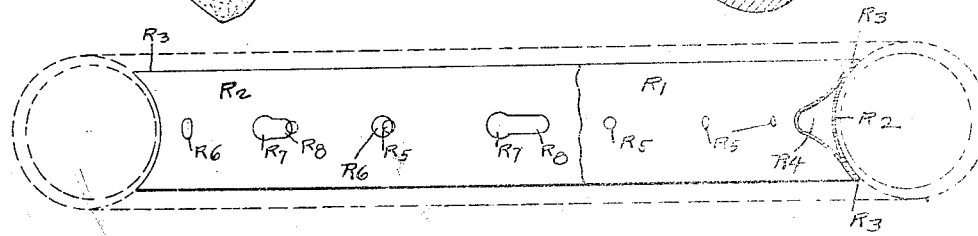
Figure 3:
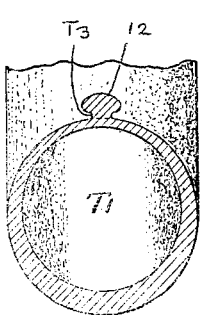
Figure 4:
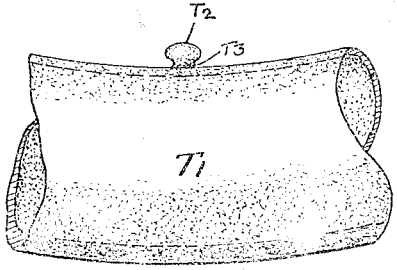

Referring to the drawing. Figure 1 is a plan view of the rim showing the manner in which it is united to the tire, portions of the rim and tire being cut away for clearness; Fig. 2 is a circumferential view of the rim member; Fg. 3 is an enlarged sectional view through the tire and the locking means; Fig. 4 is a side elevation of Fig. 3.

Similar letters and numbers of reference refer to the same or similar parts throughout the several views.

Referring in detail to the drawing. $R^1$ is the inside portion of the rim of which $R^2$ forms the outside and $R^3$ the latteral edges, $R^4$ is the hollow portion between the inside wall $R^1$ and the outside wall $R^2$. $R^5$ are openings in the inner wall $R^1$ for the spokes. The holes $R^6$ are formed in the outside wall $R^2$ and are somewhat larger than the holes $R^5$ in order that they may permit the heads of the spoke nipples to pass through the hole $R^6$, but preventing them from passing through the hole $R^5$. The holes $R^7$ are also in prolongation of the spokes and occupy positions preferably between the holes $R^6$. The holes $R^7$ are elongated and narrowed at the ends $R^8$ for purposes which will be explained later on. $R^9$ are shanks of ordinary spoke nipples on which are formed the heads $R^{10}$ and which engage the spokes $R^{11}$. The narrow ends $R^8$ of the elongated holes $R^7$ are turned back at $R^{12}$ in order that they may form a blunt edge and thereby avoid having the rim destroy its own locking device by a cutting action.

$T^1$ is the ordinary bicycle tire on which are formed the mushroom shaped buttons $T^2$ whose necks $T^3$ are securely joined to the tire $T^1$. The heads of the buttons $T^2$ are adapted to readily pass through the elongated holes $R^7$, after which operation a slight movement of either the tire or the rim will cause the necks $T^3$ on the buttons $T^2$ to lodge in the narrow portion $R^8$ of the elongated holes $R^7$ and to come in contact with the blunt edge $R^{12}$.

It will also be seen that in order to remove the tire from its rim it is only necessary to reverse this operation and the tire will be freed from the rim and ready to be rolled off.

While I have thus illustrated and described my invention it is not my intention to limit myself to this precise form or method of application, but intend that it shall cover all forms and modifications that fall fairly within the appended claim.

What I claim as new and desire to protect by Letters Patent of the United States, is:

A metal bicycle rim having a hollow cross section in combination with a tire, said hollow portion being adapted to contain heads of spoke nipples as well as heads of mushroom shaped buttons which project from the inner periphery of the tire, said rim having elongated openings formed in its outer surface, each opening having one end large enough to admit the head of a button, and the opposite end being adapted to engage the neck of said button and having a blunt edge at the end of said button engaging portion of said elongated hole which is adapted to prevent any cutting action by the rim against said button neck.

ARTHUR C. BAILEY.